United States Patent [19]
Higashikata et al.

[11] Patent Number: 5,515,217
[45] Date of Patent: May 7, 1996

[54] THERMAL PROTECTOR FOR HERMETIC ELECTRICALLY-DRIVEN COMPRESSORS

[75] Inventors: Isao Higashikata, Owariasahi; Yoshihisa Ueda, Kasugai; Hideki Koseki, Koyamanishi, all of Japan

[73] Assignee: Ubukata Industries Co., Ltd., Nagoya, Japan

[21] Appl. No.: 298,431

[22] Filed: Aug. 30, 1994

[30] Foreign Application Priority Data

Sep. 22, 1993 [JP] Japan ..................................... 5-259331
Feb. 25, 1994 [JP] Japan ..................................... 6-052917

[51] Int. Cl.⁶ .......................... H01H 37/12; H02H 7/085
[52] U.S. Cl. .................. 361/22; 361/25; 361/26; 361/103
[58] Field of Search .................. 361/24, 25, 22, 361/31, 32, 34, 26, 103; 337/368; 310/68; 339/94

[56] References Cited

U.S. PATENT DOCUMENTS

| | | | |
|---|---|---|---|
| 4,252,394 | 2/1981 | Miller | 361/24 |
| 4,467,385 | 8/1984 | Bandoli et al. | 361/24 |
| 4,791,329 | 12/1988 | Ubukata et al. | 310/68 |
| 5,015,985 | 5/1991 | Ubukata et al. | 337/368 |

FOREIGN PATENT DOCUMENTS

| | | | |
|---|---|---|---|
| 55-87170 | 6/1980 | Japan | H02H 7/08 |
| 60-95183 | 6/1985 | Japan | H02K 11/00 |

*Primary Examiner*—A. D. Pellinen
*Assistant Examiner*—S. Jackson
*Attorney, Agent, or Firm*—Foley & Lardner

[57] ABSTRACT

A thermal protector for a hermetic electrically-driven compressor including a hermetically sealed housing in which a power-supply terminal, an electric motor and a compressor are enclosed with a predetermined amount of refrigerant gas is disclosed. The thermal protector includes a thermally responsive switch having first and second lead terminal pins for securing first and second connecting terminals respectively and a holder formed from an electrically insulating material and including first, second and third cavities. Each of the first and second cavities has an opening in its one side. The first cavity accommodates the thermally responsive switch while the second cavity accommodates a secured portion between the lead terminal and the connecting terminal with a hardenable electrically insulating filler filling up the second cavity. Alternatively, the second connecting terminal is secured to a wall of the holder by an insert molding so as to extend through the wall, instead of use of the filler.

7 Claims, 8 Drawing Sheets

THERMAL PROTECTOR FOR HERMETIC ELECTRICALLY-DRIVEN COMPRESSORS

BACKGROUND OF THE INVENTION

1. Field of the Invention

This invention relates to a thermal protector protecting, against an overcurrent and/or an overheat, an electric motor enclosed in a hermetically sealed housing of an electrically-driven compressor, the housing further enclosing a compressing means and a predetermined amount of refrigerant gas, and more particularly to such a thermal protector of the type that it is disposed in the compressor housing.

2. Description of the Prior Art

Various types of thermal protectors comprising a bimetal or other thermally responsive switch elements driving a switch have conventionally been used for protecting an electric motor against an overheating condition due to overload in hermetic electrically-driven compressors. In one of the types, the thermal protector is disposed in a hermetically sealed housing of the compressor so that better heat exchange can be achieved between the thermally responsive switch and the motor or the refrigerant gas. In this type, the thermal protector is closely bound to coils of the motor with strings, as shown in FIGS. 1 and 2 of Japanese Unexamined Utility Model Application No. 55-87170. Furthermore, the thermal protector is mounted on an elastic member further mounted on an inner wall of the compressor housing, as shown in Japanese Unexamined Utility Model Application No. 60-95183.

Binding the thermal protector to the motor coils with the strings is not easy but rather troublesome. On the other hand, the mounting is rendered easier when the thermal protector is mounted on the elastic member in the compressor housing. In this case, however, the elastic member and other mounting parts need to be previously provided in the compressor housing. Furthermore, since an excessive space for insulation is required between the compressor housing and the motor windings, the compressor housing is rendered large-sized.

In view of the above-described disadvantages, U.S. Pat. No. 4,791,329 issued Dec. 13, 1988 discloses a motor protector to which terminals in the form of tabs or receptacles are secured. The protector is enclosed in a socket or mounted on an outer face of the socket. Then, the terminals of the motor protector are directly connected to terminal pins of a glass-insulated power-supply terminal disposed in the compressor housing.

The above-described motor protector is large in size although it is of a so-called plug-in type. Furthermore, its attachment to and detachment from the power supply terminal are not so easy as to be expected. Additionally, the manufacturing cost of the above motor protector is relatively high. In the above mounting structure, however, a force caused by vibration or the like during operation of the compressor acts on a secured portion between the protector and each terminal. Consequently, the secured portion between the protector and each terminal is distorted or bent. Thus, reliability in the mechanical strength of the secured portion is low.

SUMMARY OF THE INVENTION

Therefore, an object of the present invention is to provide an improved thermal protector wherein the mechanical strength of a portion of the protector connected to a power-supply terminal disposed in a hermetically sealed housing of a hermetic compressor can be improved.

Another object of the invention is to provide an improved thermal protector wherein a space for insulation between the thermally responsive switch and conductive parts or portions around it can be reduced.

In one aspect, the present invention provides a thermal protector for a hermetic electrically-driven compressor including a hermetically sealed housing in which a power-supply terminal is disposed and an electric motor and in which a compressor are enclosed with a predetermined amount of refrigerant gas. The thermal protector comprises a thermally responsive switch disposed in the housing of the compressor and including a metal casing accommodating therein a thermally responsive element and at least a pair of non-flexible lead terminals secured to the casing. A first non-flexible connecting terminal has one end connected to one of the lead terminals and the other end connected to the power-supply terminal. A second non-flexible lead terminal has an end connected to the other lead terminal. A holder is formed from an electrically insulating material and including a first cavity accommodating the casing of the thermally responsive switch, a second cavity adjacent to the first cavity in a communicating relation therewith and accommodating connected portions between the lead terminals and the first and second connecting terminals respectively, and a third cavity adjacent to the second cavity with a partition wall being provided therebetween, the other end of the first connecting terminal being fitted in the third cavity so as to be held therein. The cavities are open at one side of the holder. A hardenable electrically insulating filler is provided for filling a space defined by the inner peripheral face of the second cavity and a side of the casing facing the interior of the second cavity so that the connected portions between the lead terminals and the first and second connecting terminals are buried in the filler and so that the filler comes into contact with the side of the casing such that the casing, the lead terminals and the connecting terminals are integrally combined together by the filler hardened so as to be stationary relative to one another.

According to the above-described construction, the secured portion between the lead terminal and the connecting terminal of the thermally responsive switch is fixed integrally to the holder by the electrically insulating filler in the second cavity. Transfer of vibration from the compressor to the thermally responsive switch is blocked at the secured portion. Consequently, distortion or bend of the secured portion due to the vibration can be prevented.

Furthermore, since the thermally responsive switch is accommodated in the holder formed from the electrically insulating material, the space for insulation between the thermally responsive switch and the conductive parts or portions around it, such as the motor, can be reduced, which can enhance reduction in size of the compressor housing.

Furthermore, in the condition that the connecting terminals are held on the power-supply terminal of the compressor by way of fitting or the like, the connecting terminal is reinforced when it is accommodated in the third cavity. Consequently, deformation of the connecting terminal due to the self-weight of the protector can be prevented. In another aspect of the present invention, the first non-flexible connecting terminal has one end located in the second cavity of the holder so that this end is exposed, the other end connected to the power-supply terminal and fitted in the third cavity of the holder so that this other end is held therein, and an intermediate fitted portion which is fitted with a wall constituting the holder. The second non-flexible connecting terminal has one end located in the second cavity of the holder so that this one end is exposed, the other end projecting out of the holder, and an intermediate portion extending through a wall of the holder defining the second cavity to be held in position by way of an insert molding. The lead terminals of the thermally responsive switch are welded to one end of the first connecting terminal in the second cavity and to one end of the second connecting terminal in the second cavity respectively under the condition that the casing is accommodated in the first cavity of the holder so that connection between the lead terminal and the second connecting terminal provides substantially integral connection between the casing of the thermally responsive switch and the holder.

In a first preferred form, a member is provided in the first cavity of the holder for defining a gap between an inner peripheral face of the first cavity and an outer peripheral face of the casing of the thermally responsive switch, so that the refrigerant gas flows through the gap.

In a second preferred form, one of the lead terminals comprises a part of the casing of the thermally responsive switch.

In a third preferred form, the first cavity of the holder is open over two sides of the holder adjacent to each other.

BRIEF DESCRIPTION OF THE DRAWINGS

Other objects, features and advantages of the present invention will become clear upon reviewing the following description of preferred embodiments thereof, made with reference to the accompanying drawings, in which.

DESCRIPTION OF THE PREFERRED EMBODIMENTS

Figure 1:
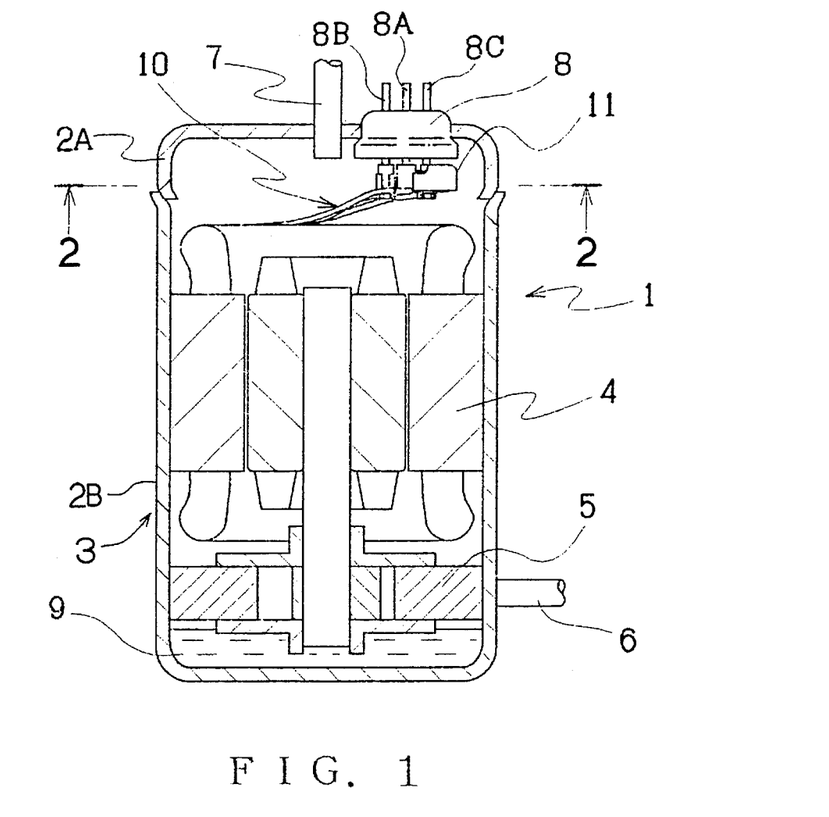
FIG. 1 is a longitudinal sectional view of a hermetic electrically-driven compressor to which a first embodiment of a thermal protector in accordance with the present invention is applied.

A first embodiment of the present invention will be described with reference to FIGS. 1 to 6. Referring to FIG. 1, a hermetic electrically-driven compressor 1 comprises a hermetically sealed high-pressure housing 3 including a top cover 2A on which a thermal protector 11 of the first embodiment is mounted so as to be located in the housing 3, and a receptacle 2B. The housing 3 encloses therein a conventional electric motor 4 and a conventional compressing means 5 driven by the motor 4. A suction pipe 6 extends through a lower peripheral wall of the housing 3 and is then connected to the compressing means 5 so that refrigerant gas delivered from an external heat exchanger (not shown) is introduced into the interior of the compressor housing 3. The refrigerant gas compressed by the compressing means 5 is discharged into the compressor housing 3, flowing along the periphery of the motor 4. The refrigerant gas is then circulated into the heat exchanger through a discharge pipe 7 extending through the cover 2A. A glass-insulated power-supply terminal 8 air-tightly extends through the cover 2B of the compressor housing 3 and is then secured in position by way of welding.

Figure 2:
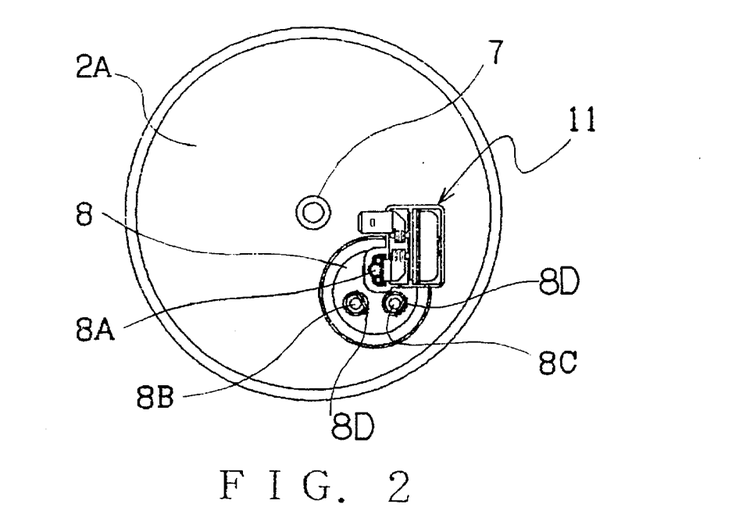
FIG. 2 is a sectional view taken along line 2—2 in FIG. 1.
Figure 3:
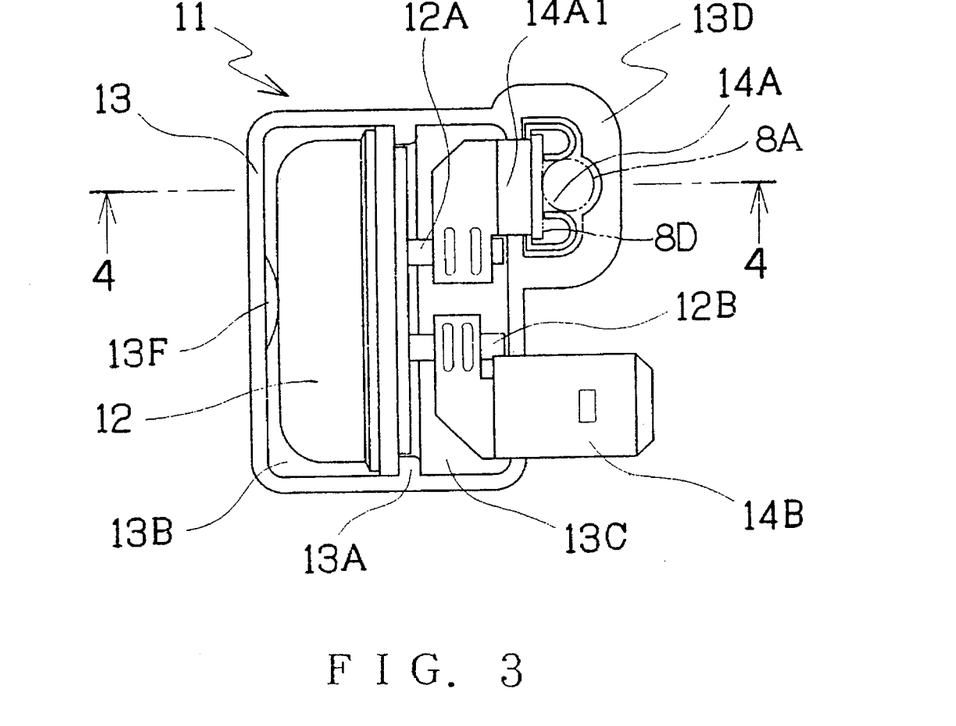
FIG. 3 is a plan view of the thermal protector in the state that a second cavity is not filled with an electrically insulating filler.

The power-supply terminal 8 includes three electrically conductive pins 8A, 8B and 8C. Three connecting tab terminals 8D are mounted on ends of the conductive pins 8A, 8B, 8C located in the compressor housing 3 respectively, as shown in FIGS. 2 and 3. Lead wires 10 extending from windings of the motor 4 are connected to the conductive pins 8B, 8C respectively. The thermal protector 11 is connected to the other conductive pin 8A.

Figure 4:
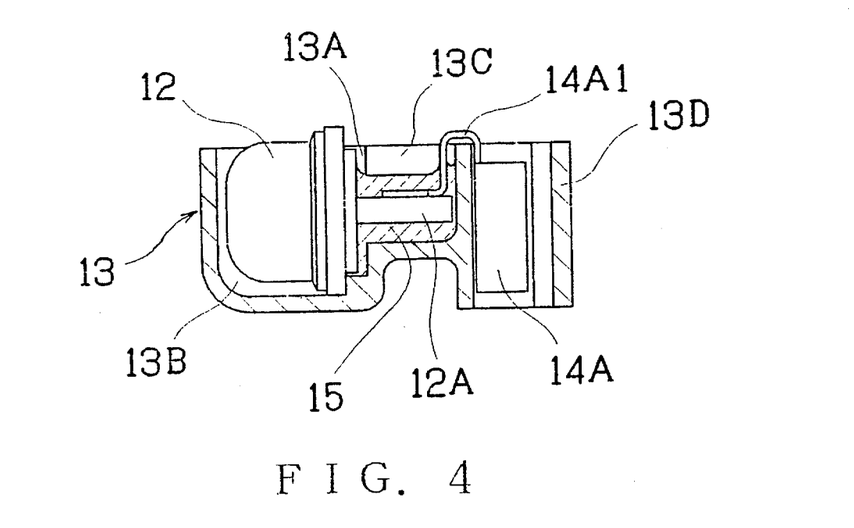
FIG. 4 is a sectional view taken along line 4—4 in FIG. 3, showing the state that the second cavity is filled with the electrically insulating filler.
Figure 5:
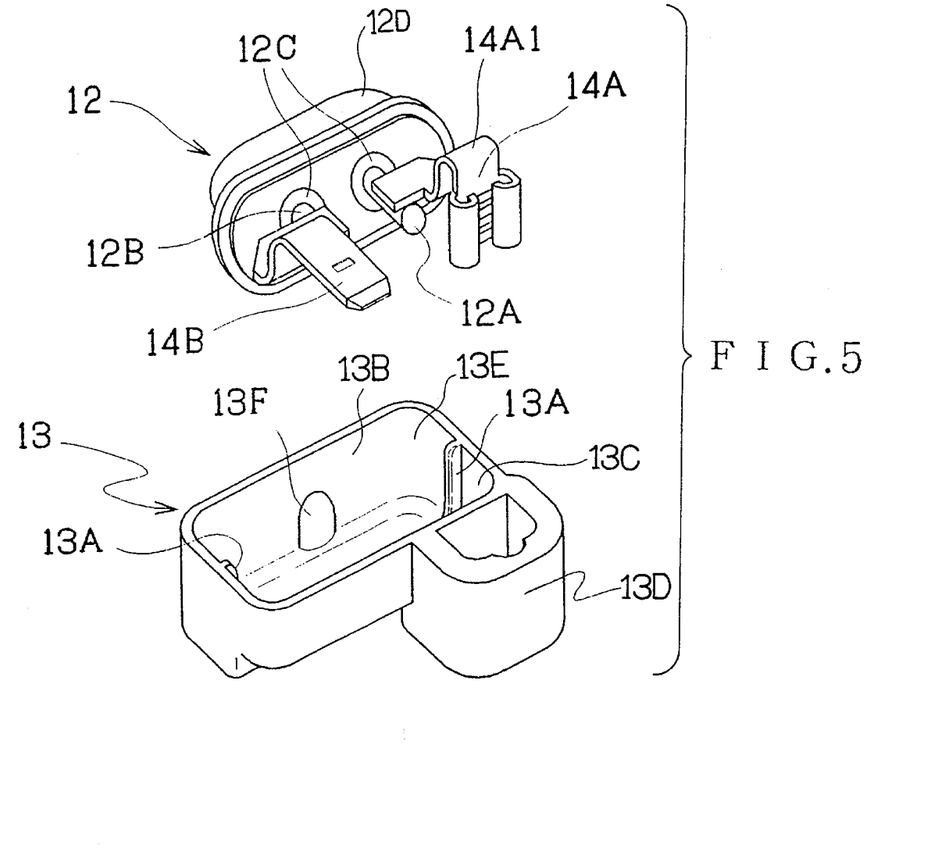
FIG. 5 is an exploded perspective view of the thermal protector.

The thermal protector 11 will now be described with reference to FIGS. 3 to 6. The thermal protector 11 comprises a thermally responsive switch 12 and an electrically insulating holder 13 accommodating the thermally responsive switch 12, as shown in FIG. 5. The thermally responsive switch 12 comprises a hermetically sealed metal casing 12D and a bimetallic thermally responsive element (not shown) enclosed in the casing 12D, as well known in the art. The structure of such a thermally responsive element is disclosed in U.S. Pat. No. 5,015,985, for example.

The thermally responsive switch 12 has two lead terminal pins 12A and 12B each extending through a wall of the casing 12D and air-tightly fixed in position by a sealing material 12C such as glass or ceramic. Two connecting terminals 14A and 14B are connected to the respective lead terminal pins 12A, 12B by way of welding or the like. The connecting terminals 14A, 14B are to be further connected to the conductive pin 8A of the power-supply terminal 8 and a receptacle (not shown) connected to the lead wire 10 from the motor 4 respectively.

The holder 13 is generally formed into the shape of a box and has an opening 13E in one side. An inner space of the holder 13 is partitioned by a rib 13A into a main accommodating section 13B or first cavity and a terminal accommodating section 13C or second cavity. The body of the thermally responsive switch 12 is enclosed in the main accommodating section 13B while the terminal pins 12A, 12B of the thermally responsive switch 12 are accommodated in the terminal accommodating section 13C. A terminal holding section 13D or third cavity having upper and lower open ends is provided to be adjacent to the terminal accommodating section 13C.

Figure 6:
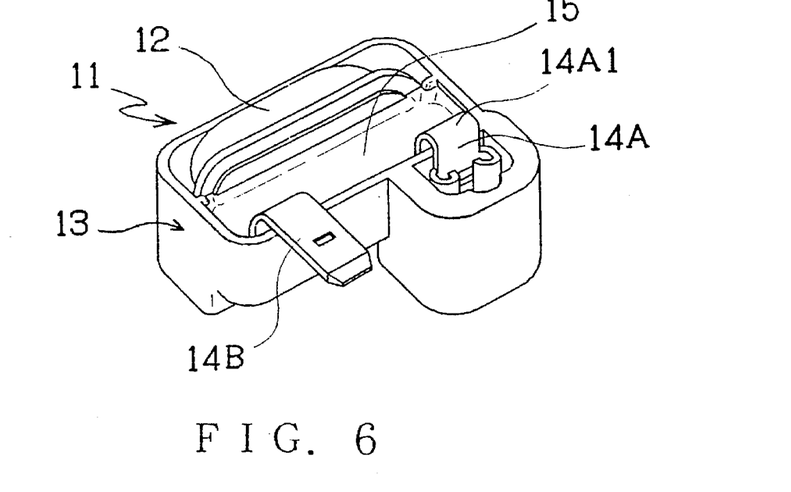
FIG. 6 is a perspective view of the thermal protector in an assembled state.

The connecting terminals 14A, 14B are secured to the respective lead terminal pins 12A, 12B by welding. Thereafter, a distal end of the connecting terminal 14A is inserted into the terminal holding section 13D. Simultaneously, the casing 12D of the thermally responsive switch 12 is accommodated in the main accommodating section 13B and secured portion between the lead terminal pins 12A, 12B and the connecting terminals 14A, 14B respectively are accommodated in the terminal accommodating section 13C. A pushing protrusion 13F is formed on the inner wall of the main accommodating section 13B of the holder 13. One end face of the casing of the thermally responsive switch 12 accommodated in the main accommodating section 13B is pushed against the rib 13A by the protrusion 13F, whereupon the thermally responsive switch 12 is temporarily held by the holder 13 in the condition that a gap is defined between the inner peripheral face of the main accommodating section 13B and the outer periphery of the casing 12D of the thermally responsive switch 12. In this condition, a predetermined amount of liquid electrically insulating filler 15 such as a mixture of an epoxy resin and a hardening agent is poured into the terminal accommodating section 13C so that the secured portions between the lead terminal pins 12A, 12B and the connecting terminals 14A, 14B respectively are covered by the filler 15. The filler 15 is hardened so that the thermally responsive switch 12 is fixed to the holder 13 as shown in FIGS. 4 and 6. The thermally responsive switch 12 thus accommodated in and fixed to the holder 13 is efficiently brought into contact with the refrigerant gas in the compressor housing 3 via the opening 13E of the holder 13, whereupon heat exchange is performed between the thermally responsive switch 12 and the refrigerant gas.

Figure 7:
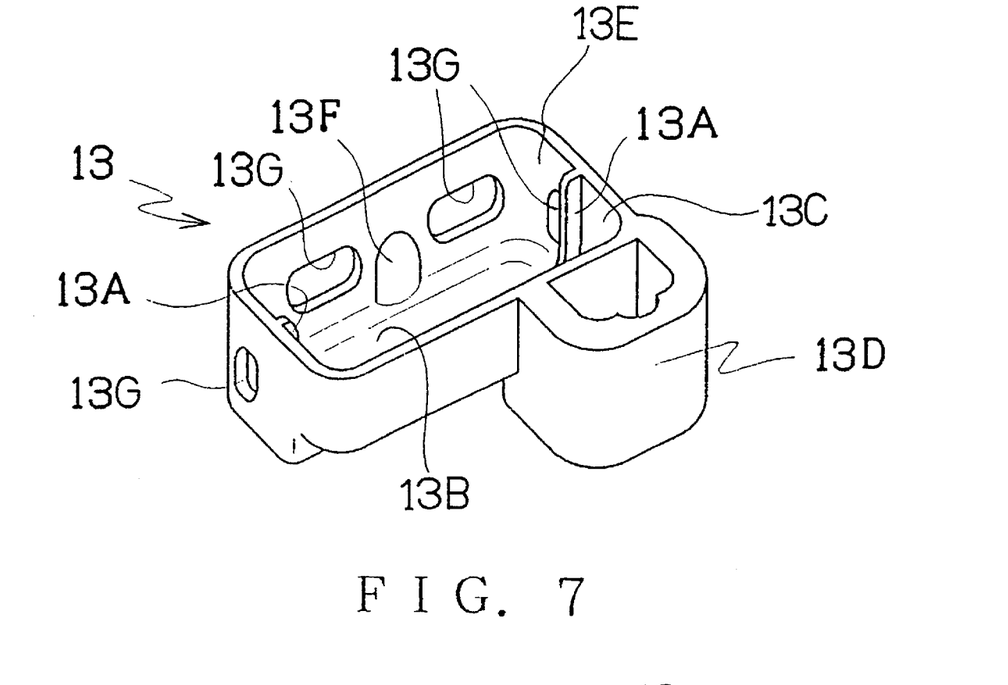
FIG. 7 is a perspective view of a holder employed in a second embodiment of a thermal protector in accordance with the present invention.

The electrically insulating filler 15 serving as an integrating member may be poured into the main accommodating section 13B accommodating the thermally responsive switch 12 in the present invention. In the embodiment, however, the end face of the housing 12D of the thermally responsive switch 12 is caused to come into close contact with the rib 13A so that the filler 15 is prevented from flowing into the main accommodating section 13B. Accordingly, an amount of filler 15 used can be saved. Furthermore, since the refrigerant gas flows through a space around the thermally responsive switch 12 in the main accommodating section 13B, and through the gap around the casing 12D, the efficiency of heat exchange can be improved, which results in improvement in the thermal responsiveness of the thermally responsive switch to the heating due to an overheating condition of the motor or an abnormal condition of the compressing means. The heat exchange efficiency can be further improved when a plurality of through holes 13G are formed in side walls of the main accommodating section 13B of the holder 13 as shown as a second embodiment in FIG. 7.

Figure 8:
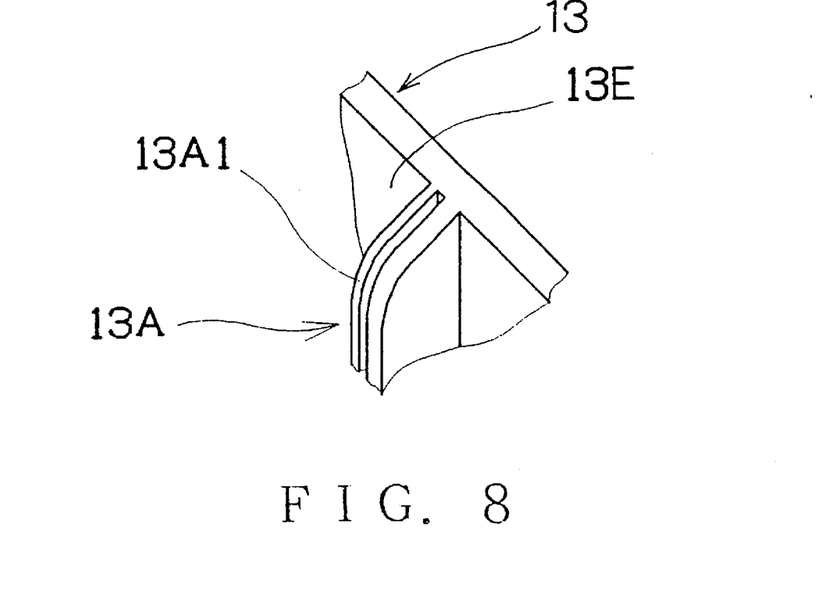
FIG. 8 is an enlarged perspective view of a part of a rib of a holder employed in a third embodiment of a thermal protector in accordance with the present invention.

Referring to FIG. 8 showing a third embodiment, a thin plate portion 13A1 may be provided to be opposite to the rib 13A in order that the thermally responsive switch 12 comes into more close contact with the holder 13. The thin plate portion 13A1 is caused to elastically come into contact with the thermally responsive switch 12 or an elastic material such as a silicon rubber may be provided instead of the thin plate portion 13A1 so that the insulating filler 15 poured into the terminal accommodating section 13C can be prevented from flowing into the main accommodating section 13B. Furthermore, the holder 13 may be formed from a material with sufficient elasticity.

According to the above-described construction, the secured portions between the lead terminal pins 12A, 12B and the connecting terminals 14A, 14B respectively are accommodated in the terminal accommodating section 13C into which the hardenable electrically insulating filler 15 is then poured so that the secured portions are fixed in the section 13C. A force caused by the vibration of the compressor motor and resulting in distortion and bending is not transferred to the secured portions though the thermally responsive switch 12 which is held on the power-supply terminal 8 further held in the hermetically sealed housing 3 of the compressor 1. Consequently, the connecting terminals 14A, 14B can be prevented from dropping out of the thermally responsive switch 12. Furthermore, the above-described construction can reduce vibrational stress imposed on the sealing material 12C, such as glass or ceramic, holding the lead terminal pins 12A, 12B of the thermally responsive switch 12. Consequently, the thermally responsive switch 12 can be prevented from damage in the airtightness thereof due to occurrence of a crack in the sealing material 12C.

The thermal protector 11 is held by a single connecting terminal 14A on the power-supply terminal 8 of the compressor 1. Accordingly, there is a possibility that a portion of the connecting terminal 14A or particularly, a bent portion 14A1 thereof may be deformed or broken when a force due to the self-weight of the thermal protector 11 subjected to the vibration of the compressor concentrates upon the portion of the connecting terminal 14A. In the above-described construction, however, the connecting terminal 14A is holding in the terminal accommodating section 13D of the holder 13, so that the connecting terminal 14A is reinforced so as not to be moved. Consequently, the bent portion 14A1 of the connecting terminal 14A can be prevented from being deformed or broken.

Since the thermally responsive switch 12 is accommodated in the electrically insulating holder 13, the space for insulation can be reduced between the thermally responsive switch 12 and electrically conductive parts or portions around it. Furthermore, since the lead terminal pins 12A, 12B and the connecting terminals 14A, 14B are embedded in the electrically insulating filler 15, the space for insulation between the terminals can be reduced, which enhances miniaturization of the thermal protector.

Figure 9:
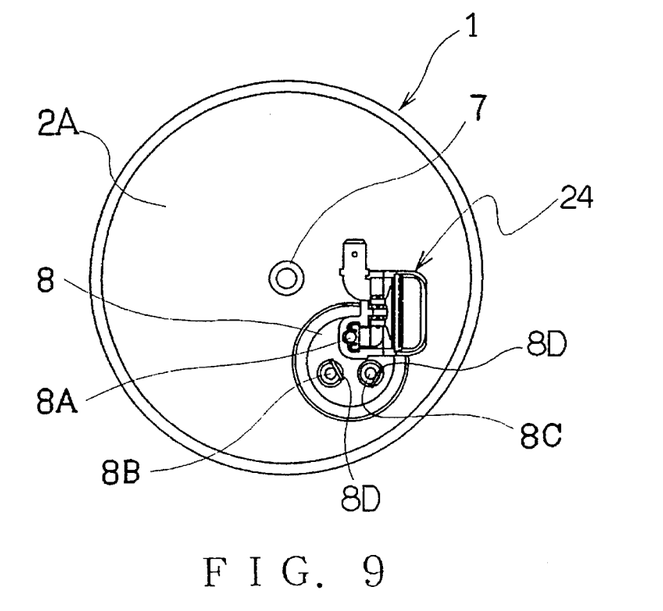
FIG. 9 is a view similar to FIG. 2 showing a fourth embodiment of a thermal protector in accordance with the present invention.
Figure 10:
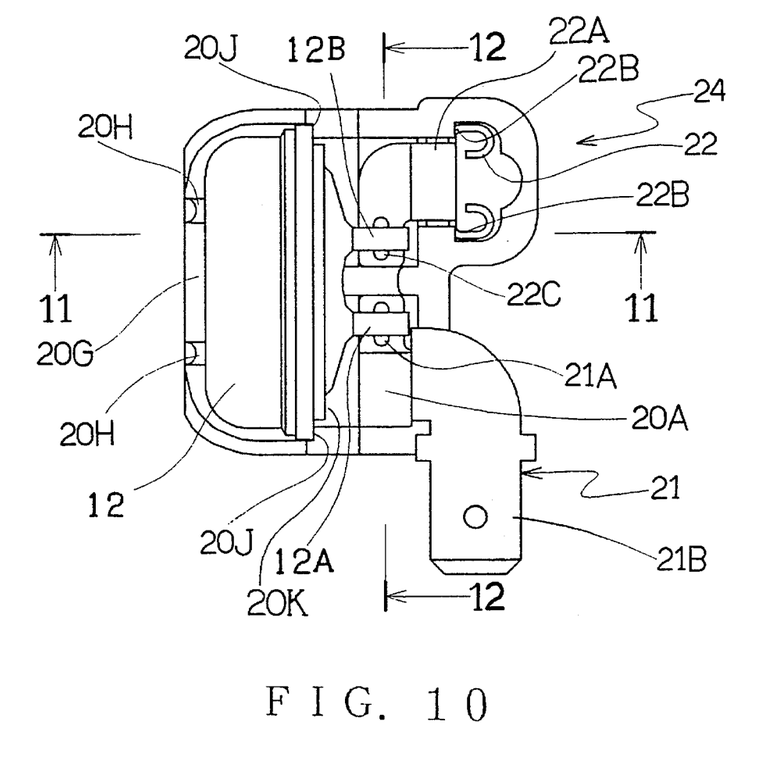
FIG. 10 is a plan view of the thermal protector of the fourth embodiment.
Figure 11:
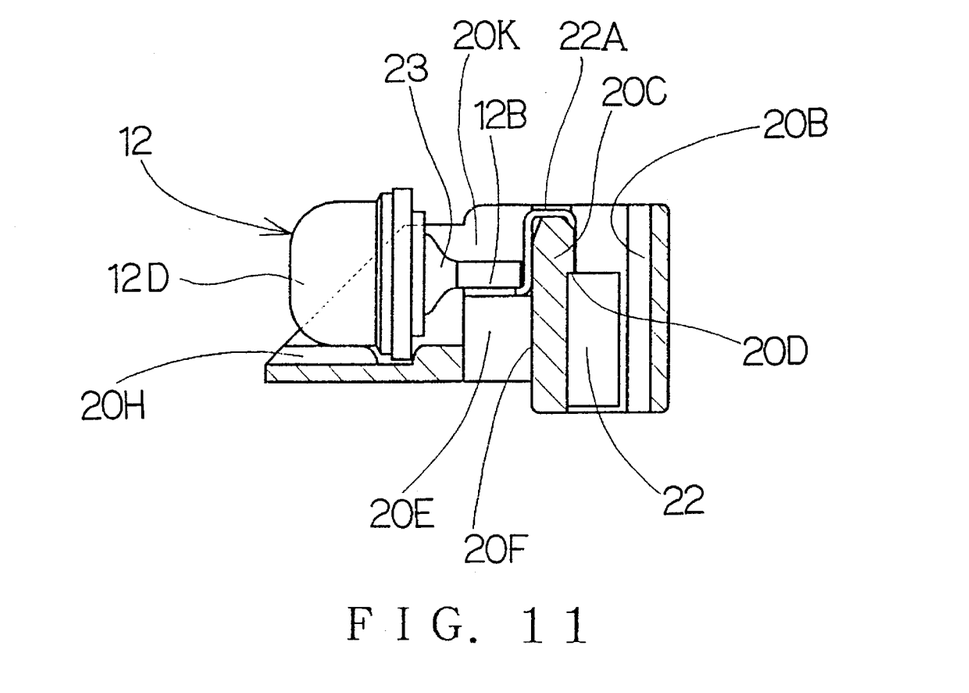
FIG. 11 is a sectional view taken along line 11—11 in FIG. 10.
Figure 12:
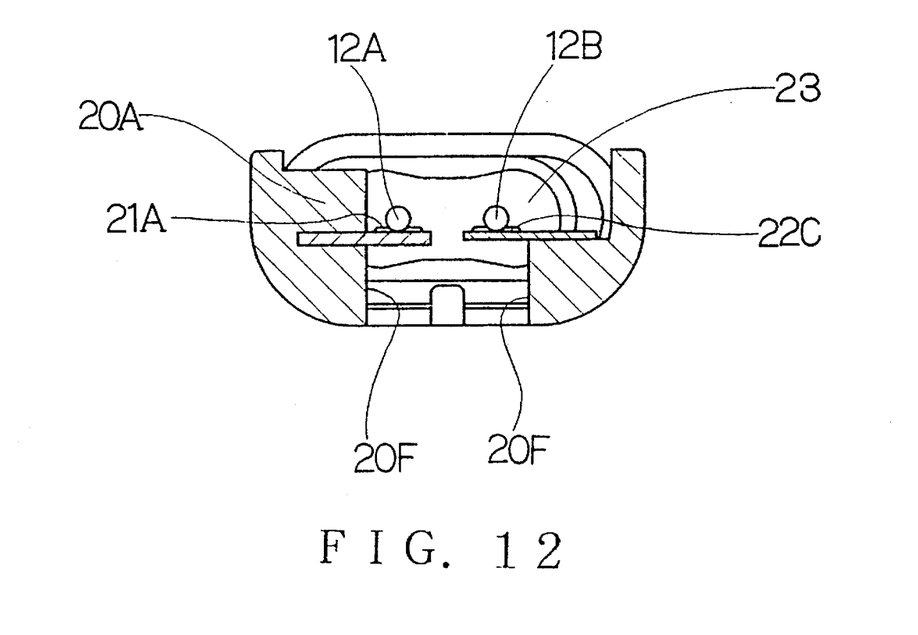
FIG. 12 is a sectional view taken along line 12—12 in FIG. 10.
Figure 13:
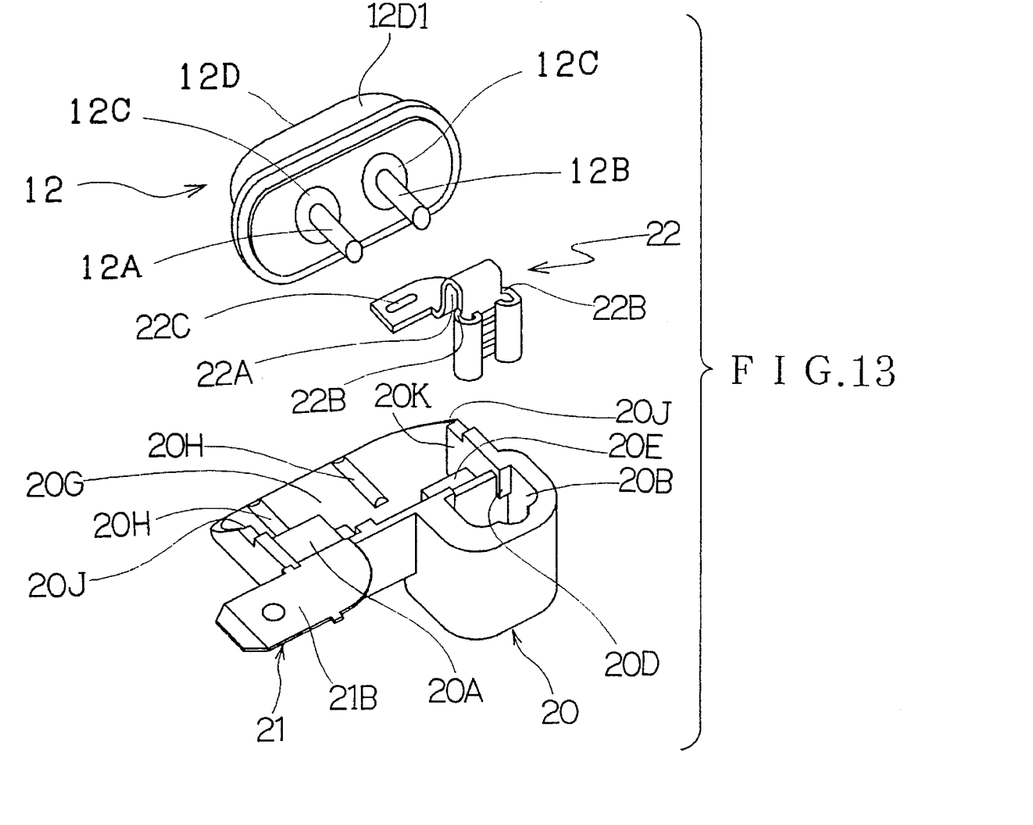
FIG. 13 is an exploded perspective view of the thermal protector of the fourth embodiment.
Figure 14:
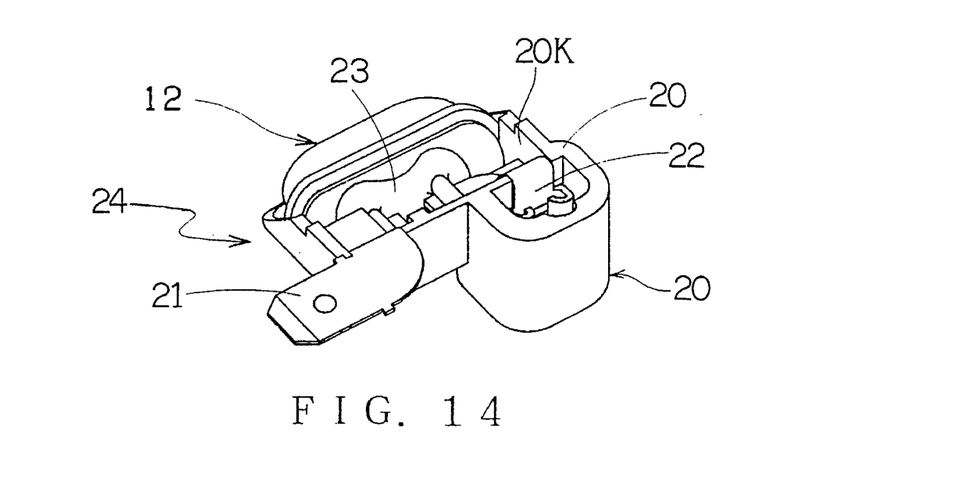
FIG. 14 is a perspective view of the thermal protector of the fourth embodiment in an assembled state.
Figures 15, 16:
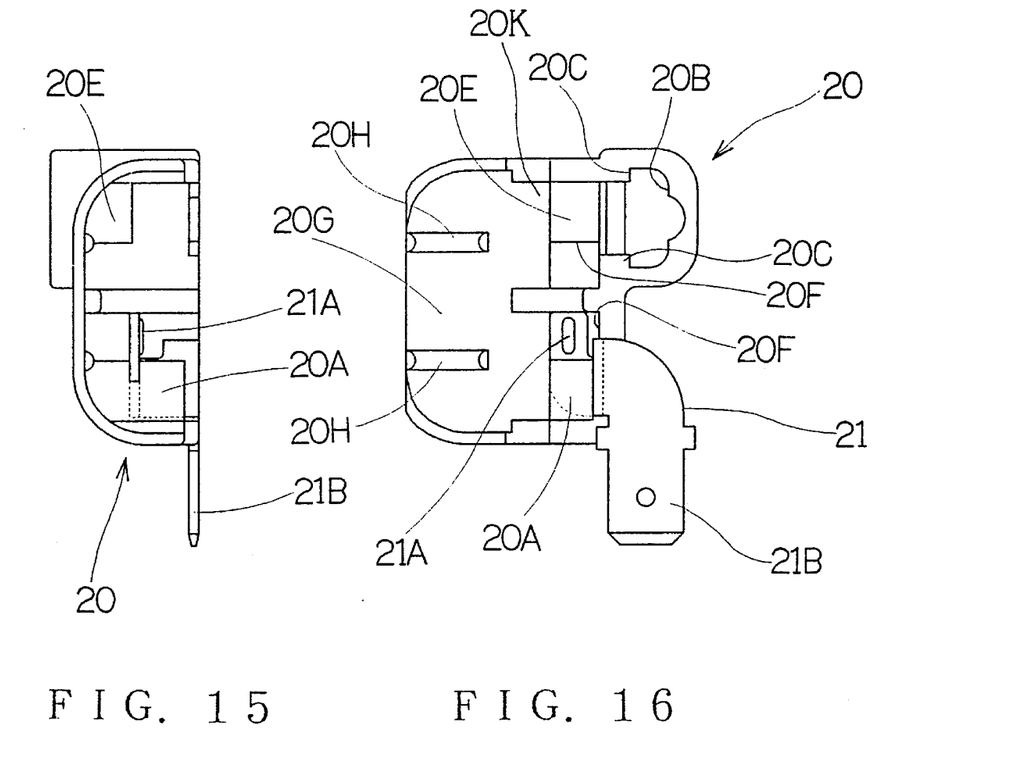
FIG. 15 is a side view of a holder employed in the thermal protector of the fourth embodiment.
FIG. 16 is a plan view of the holder employed in the thermal protector of the fourth embodiment.

FIGS. 9 to 16 describe a fourth embodiment of the invention. Since the heat capacity of the insulating filler 15 employed in the foregoing embodiments is relatively large, the heat generated by the thermally responsive switch 12 is transferred to the holder 13. Consequently, a quick response of the thermally responsive switch 12 may not be expected. The fourth embodiment is directed to an improvement of this drawback. As shown in FIGS. 13, 14 and 16, the holder 20 includes a main accommodating section 20G or first cavity, a terminal accommodating section 20K or second cavity and a terminal holding section 20B or third cavity. In the main accommodating section 20G, the upper face and one of side faces adjacent to the upper face are open. In particular, the second cavity 20K is located between positioning portions 20J provided in the first cavity 20G for positioning the casing of the thermally responsive switch 12 and the third cavity 20B and is contiguous to the first cavity 20G. The connecting terminal 21 is previously fixed on a terminal fixing section 20A by way of an insert molding. The terminal fixing section 20A is a part of a wall defining the second cavity 20K. In the fourth embodiment, the terminal fixing section 20A thus serves as the integrating member. Both ends 21A and 21B of the connecting terminal 21 are exposed from the holder 20 for the purpose of electrical connection. The connecting terminal 22 is holding in the terminal accommodating section 20B. A bent portion 22A of the connecting terminal 22 is fitted with an upper portion of a wall 20C of the terminal holding section 20B as shown in FIG. 11. In this condition, a shoulder 22B of the connecting terminal 22 is elastically engaged with a stepped portion 20D formed on the inner wall of the terminal holding section 20B, whereby the connecting terminal 22 is held by the holder 20. A shelf 20E is provided for positioning an end of the connecting terminal 22 at the side of its welded zone 22C, as will be described later.

Referring to FIGS. 10 and 12, the ends of the connecting terminals 21, 22 located in the second cavity 20K of the holder 20 have weld zones 21A, 22C to which the lead terminal pins 12A, 12B are secured by welding, respectively. Through holes 20F are formed in the wall of the second cavity 20K of the holder 20 so as to correspond the respective weld zones. One of welding electrodes is inserted through each of the through holes 20F.

The thermally responsive switch 12 is accommodated in the main accommodating section 20G of the holder 20, as shown in FIGS. 10, 11 and 14. The thermally responsive switch 12 is then positioned by the rib 20H and the positioning portions 20J. Thereafter, the lead terminal pins 12A, 12B are welded to the weld zones 21A, 22C of the connecting terminals 21, 22 previously fixed to the holder 20 respectively, whereby the thermally responsive switch 12 is fixed to the holder 20. The rib 20H provides a gap between the outer face of the casing 12D and the inner bottom face of the main accommodating section 20G of the holder 20 in the condition that the thermally responsive switch 12 is accommodated in the main accommodating section 20G. The gap permits the refrigerant gas to pass therethrough. In the welding, one of the welding electrodes is brought into contact with the lead terminal pin 12A or 12B from above as viewed in FIG. 12 while the other welding electrode is inserted through the through hole 20F from below and brought into contact with the underside of the welding zone 21A or 22C of the connecting terminal 21 or 22, so that an electric resistance welding is performed. In the fourth embodiment, particularly, an insulating material 23 such as an adhesive or resin is applied to a part of the wall of the thermally responsive switch near the lead terminal pins 12A, 12B extending from the part for improvement in the withstand voltage between the lead terminal pin and the metal housing of the thermally responsive switch, as shown in FIGS. 11 and 14. Alternatively, a pelletized insulating material 23 is melted and hardened so that the insulation distance is increased between each of the lead terminal pins and the metal housing of the thermally responsive switch.

Mounting the thermal protector 24 in the hermetic compressor 1 will now be described. The tab 8D of the conductive terminal pin 8A of the power-supply terminal 8 of the compressor 1 shown in FIG. 9 is inserted into the connecting terminal 22 of the thermal protector 24. The other connecting terminal 21 of the thermal protector 24 is connected to a receptacle (not shown) mounted on the distal end of one of the lead wires 10 extending from the windings of the motor 4 shown in FIG. 1. Thus, the connection and fixing of the thermal protector 24 are completed.

Upon operation of the compressor, a torsional or bending force caused by the vibration of the compressor is conventionally applied to the lead terminal pin of the thermal protector via the lead wires from the compressor motor or the power-supply terminal. In the fourth embodiment, however, the middle portion of the connecting terminal 21 is fixed to the holder 20 by way of the insert molding. Furthermore, the bent portion 22A of the connecting terminal 22 is elastically fitted with the wall 20C of the holder 20. Accordingly, the force caused by the vibration of the compressor is received by the whole holder 20. Thus, the force does not concentrate upon the secured or welded portions between the respective connecting terminals and the thermally responsive switch. Consequently, the secured portions can be prevented from being deformed or damaged. Furthermore, since the connecting portion between the connecting terminal 22 and the power-supply terminal 8 is held by the terminal holding sections 20B, deflection and distortion of the connecting terminal 22 is limited, the connecting terminal 22 can be prevented from being deformed or damaged.

A dome-shaped portion 12D1 of the housing 12D of the thermally responsive switch 12 is exposed around. The refrigerant gas in the compressor housing flows in direct contact with the thermally responsive switch 12, so that the thermal protector 24 can quickly respond to the change in the temperature of the refrigerant gas. Although the dome-shaped portion 12D1 of the thermally responsive switch 12 is not electrically insulated, it is sufficiently distant from the cover 2A and the receptacle 2B of the compressor 1. Consequently, the dome-shaped portion 12D1 does not pose a problem of insulation.

In the foregoing embodiments, each of the lead terminal pins 12A, 12B of the thermally responsive switch 12 is formed into the shape of a pin and extends through the wall of the switch housing to be fixed in position, electrically insulated from the housing wall. Alternatively, the switch housing itself may be used as a terminal. In this construction, one of the connecting terminals is welded to the switch housing.

Although the present invention is applied to the electrically driven compressor comprising the hermetically sealed high-pressure housing in the foregoing embodiments, the invention may be applied to hermetically sealed low-pressure compressors. Furthermore, the types of the compressing means should not be limited to that described above. The invention can be applied to rotary, scroll and reciprocal compressing means.

The foregoing disclosure and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A thermal protector for a hermetic electrically-driven compressor including a hermetically sealed housing in which a power-supply terminal is disposed and an electric motor and a compressing means are enclosed with a predetermined amount of refrigerant gas, the thermal protector comprising:

a thermally responsive switch disposed in the housing and including a metal casing accommodating therein a thermally responsive element and at least a pair of non-flexible lead terminals secured to the casing;

a first non-flexible connecting terminal having a first end connected to a first lead terminal and a second end connected to the power-supply terminal;

a second non-flexible connecting terminal having an end connected to a second lead terminal;

a holder formed from an electrically insulating material and including a first cavity accommodating the casing of the thermally responsive switch, a second cavity adjacent to the first cavity in a communicating relation therewith, the second cavity accommodating connected portions between the first and second lead terminals and the first and second connecting terminals respectively, and a third cavity adjacent to the second cavity with a partition wall being provided therebetween, the second end of the first connecting terminal being fitted in the third cavity so as to be held therein, the first, second and third cavities being open at one side of the holder; and a hardenable electrically insulating filler filling a space defined by an inner peripheral face of the second cavity and a side of the casing facing an interior of the second cavity so that the connected portions between the first and second lead terminals and the first and second connecting terminals are buried in the filler and so that the filler comes into contact with the side of the casing such that the casing, the first and second lead terminals, and the first and second connecting terminals are integrally combined together by the filler so as to be stationary relative to one another.

2. A thermal protector according to claim 1, wherein a member is provided in the first cavity of the holder for defining a gap between an inner peripheral face of the first cavity and an outer peripheral face of the casing of the thermally responsive switch so that the refrigerant gas flows through the gap.

3. A thermal protector according to claim 1, wherein one of the lead terminals comprises a part of the casing of the thermally responsive switch.

4. A thermal protector for a hermetic electrically-driven compressor including a hermetically sealed housing in which a power-supply terminal is disposed and an electric motor and a compressing means are enclosed with a predetermined amount of refrigerant gas, the thermal protector comprising:

a holder disposed in the housing and formed from an electrically insulating material, the holder including a first cavity, a second cavity adjacent to the first cavity in a communicating relation therewith, and a third cavity adjacent to the second cavity with a partition wall being provided therebetween, the first, second and third cavities being open at one side of the holder;

a first non-flexible connecting terminal having a first end located in the second cavity of the holder so that the first end is exposed, a second end connected to the power-supply terminal and fitted in the third cavity of the holder so that said second end is held therein, and an intermediate fitted portion which is fitted with a wall constituting the holder;

a second non-flexible connecting terminal having a first end located in the second cavity of the holder so that the first end is exposed, a second end projecting out of the holder, and an intermediate portion extending through a wall of the holder defining the second cavity to be held in position by way of an insert molding; and a thermally responsive switch including a metal casing accommodating therein a thermally responsive element and at least a pair of non-flexible lead terminals secured to the casing, the lead terminals being welded to the first end of the first connecting terminal in the second cavity and to the first end of the second connecting terminal in the second cavity respectively under the condition that the casing is accommodated in the first cavity of the holder so that connection between the respective lead terminal and the second connecting terminal provides substantially integral connection between the casing of the thermally responsive switch and the holder.

5. A thermal protector according to claim 4, wherein a member is provided in the first cavity of the holder for defining a gap between an inner peripheral face of the first cavity and an outer peripheral face of the casing of the thermally responsive switch so that the refrigerant gas flows through the gap.

6. A thermal protector according to claim 4, wherein one of the lead terminals comprises a part of the casing of the thermally responsive switch.

7. A thermal protector according to claim 4, wherein the first cavity of the holder is open over two sides of the holder adjacent to each other.

* * * * *